United States Patent
Watts, Jr. et al.

(10) Patent No.: US 8,331,985 B2
(45) Date of Patent: Dec. 11, 2012

(54) COMBINATION PERSONAL DATA ASSISTANT AND PERSONAL COMPUTING SYSTEM DYNAMIC MEMORY RECLAMATION

(75) Inventors: La Vaughn F. Watts, Jr., Austin, TX (US); Nobuyuki Albert Sato, Austin, TX (US); Gary Douglas Huber, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/458,500

(22) Filed: Apr. 27, 2012

(65) Prior Publication Data

US 2012/0254106 A1    Oct. 4, 2012

Related U.S. Application Data

(63) Continuation of application No. 12/754,002, filed on Apr. 5, 2010, now Pat. No. 8,170,610, which is a continuation of application No. 09/770,162, filed on Jan. 26, 2001, now abandoned.

(51) Int. Cl.
*H04M 1/00* (2006.01)
*G06F 13/14* (2006.01)

(52) U.S. Cl. ............... 455/556.1; 455/556.2; 710/303

(58) Field of Classification Search ............... 455/556.1, 455/556.2, 412.1, 412.2, 413, 426.1, 435.1, 455/435.2, 557, 78; 710/305, 306, 313, 316
See application file for complete search history.

(56) References Cited

U.S. PATENT DOCUMENTS

| | | | |
|---|---|---|---|
| 5,488,359 A | 1/1996 | Faris et al. | |
| 5,590,338 A | 12/1996 | Parks et al. | |
| 5,608,884 A | 3/1997 | Potter | |
| 5,742,794 A | 4/1998 | Potter | |
| 5,809,262 A | 9/1998 | Potter | |
| 6,052,735 A | 4/2000 | Ulrich et al. | |
| 6,266,539 B1 | 7/2001 | Pardo | |
| 6,779,019 B1 | 8/2004 | Mousseau et al. | |
| 6,832,084 B1 | 12/2004 | Deo et al. | |
| 6,873,841 B1 | 3/2005 | Sagar | |
| 6,891,887 B1 | 5/2005 | Dobson | |
| 8,170,610 B2 * | 5/2012 | Watts et al. | 455/556.1 |

* cited by examiner

*Primary Examiner* — Eugene Yun
(74) *Attorney, Agent, or Firm* — Hamilton & Terrile, LLP; Stephen A. Terrile

(57) ABSTRACT

In order to continually receive messages in a dual personal computer system (PC) and personal digital assistant system (PDA) computer architecture, the PC system is deactivated to conserve battery power while the PDA continues to receive messages. As PDA memory is filled with messages, messages that are synchronized and archived with the PC system are 5 deleted and space is freed for incoming messages. When new and non-synchronized messages completely fill the PDA memory array, the PC system is reactivated or the user is informed.

27 Claims, 5 Drawing Sheets

COMBINATION PERSONAL DATA ASSISTANT AND PERSONAL COMPUTING SYSTEM DYNAMIC MEMORY RECLAMATION

CROSS REFERENCE TO RELATED PATENT APPLICATIONS

This application is related to commonly assigned patent application Ser. No. 09/740,138, filed Dec. 18, 2000 and entitled "A COMBINATION PERSONAL DATA ASSISTANT AND PERSONAL COMPUTING DEVICE" having La Vaughn F. Watts, Jr. and Ronald D. Shaw as inventors.

This application is a continuation of application Ser. No. 12/754,002, filed Apr. 5, 2010 now U.S. Pat. No. 8,170,610, which is a continuation of U.S. patent application Ser. No. 09/770,162, filed Jan. 26, 2001, now abandoned, both of which are incorporated herein by reference in their entireties.

BACKGROUND OF THE INVENTION

1. Field of the Invention

This invention relates generally to a computing system and more particularly to a mobile computing system integrating dissimilar computing architectures and receiving messages and files, with the messages and files arranged to conserve memory space with minimal user intervention.

2. Description of the Related Art

There are currently two popular types of mobile computing systems. The mobile Personal Computer (PC) system is a fully functional data processing system, typically having the same functionality as a desktop PC or a workstation PC. The mobile PC system (PC system) can run under any number of standard operating systems (OS), such as one of the releases of Windows® by the Microsoft Corporation. In implementing the PC system in a mobile computing architecture, several relatively undesirable features are apparent. First, the batteries of the PC system must be recharged after a relatively short time, typically in the order of a few hours. Despite improvements in battery technology, the quest for lighter and more compact portable units have tended to reduce the space allocated to the batteries so that time between charging of the batteries has not been significantly improved. The batteries used in the PC system, however, are capable of relatively rapid charging. As with the desktop PC unit and the workstation PC from which they are derived, the OS needed for the PC system requires a relatively long time from the activation of the power switch to the time when the processing system is available for actual computation. The PC system, however, has remarkable flexibility and can provide processing capability of extraordinary power. PC systems also have great memory capacity, having disk drives that can store significant amounts of information.

More recently the personal digital assistant (PDA) system has been developed to take advantage of operating systems (OS) such as Palm® OS and Windows® CE. These operating systems, in conjunction with a PDA system, permit a reduced or specialized functionality computing system.

PDA systems are relatively small in physical size and can perform a variety of useful functions such as arrange calendars; schedule appointments; send and receive e-mail; provide presentations; create documents; and provide communications. The PDA OS can permit exchange of files between the PDA systems and a PC system with Microsoft Windows® files. While the reduced functionality can be a disadvantage of the PDA system, the PDA system has several advantages. An advantage is the time between charging of the batteries can be greatly extended, a result of the reduced functionality and the absence of disk storage units. The PDA system has its memory loaded in a memory circuit, such as a flash memory, which allows the PDA system to become active much quicker than a PC system. This memory, however, has limited capacity and can quickly be filled up.

Current PC systems and PDA systems have the capability to communicate and receive messages such as email, particularly through wireless communication technologies. The PC systems with their large memory capacity can receive and store a great number of messages before memory space is exhausted. PC systems, however, with their draining power requirement cannot continuously be left on while in battery mode. Therefore a PC system is limited in the number of messages it receives because it cannot continually be left on. A PDA system with its low battery consumption has the capability to remain on for a very long time. A PDA system, however, with its limited memory capacity can quickly run out of memory. Without operator intervention, a PDA system with its memory capacity fully filled, is not able to receive incoming messages. Therefore current PC systems and PDA systems are limited in their abilities to receive incoming messages such as email. A need has been felt for a mobile computing architecture having the desirable features of both the PC systems and of the PDA systems. In particular, the computing architecture would have the feature of an expanded time between battery charges. Another feature of the computing architecture would be the ability to continually receive incoming messages such as email and store messages until a user reads the messages. Yet another feature would be provide for a computing architecture that archives messages and allows incoming messages to be continually received with minimal user intervention.

SUMMARY OF THE INVENTION

The aforementioned and other features are accomplished, according to the present invention, by providing a mobile computing architecture that includes a PC system and a PDA system which independently have access to a communication device, allowing either system to communicate and receive messages regardless of the active state of the other system.

Messages are synchronized between the PDA system and the PC system so either system is able to read messages that have been received by the other system. The PC system with its large memory capacity is able to archive and store messages, therefore the PDA is able to free up memory space by deleting records whenever its memory is filled and new messages are unable to be stored.

To conserve battery power, the PC system is deactivated or placed in a suspend state while the PDA system continues to receive messages. As the memory of the PDA system is filled with new non-synchronized messages, synchronized messages in the PDA memory are automatically deleted. When the PDA memory array is filled with new non-synchronized messages the PC system can be activated to synchronize messages, archive messages, and clear messages in order to free up space for incoming messages. The user may also be informed to read new messages and take action to free up space.

The present invention may be better understood, and it's numerous objects, features and advantages made apparent to those skilled in the art by referencing the accompanying drawings. The use of the same reference number throughout the figures designates a like or similar element.

Figure 1:
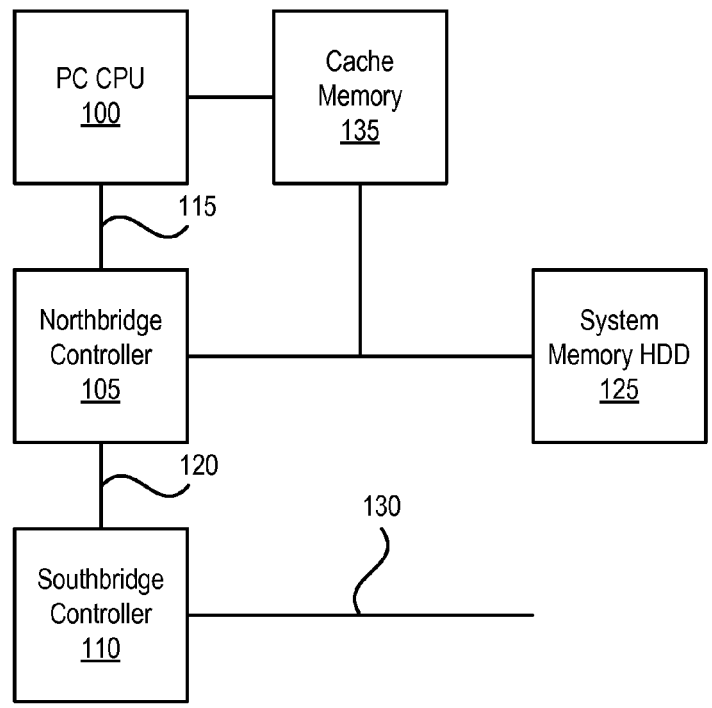
FIG. 1 illustrates a block diagram of a personal computer (PC) system.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Now referring to FIG. 1 illustrated is a block diagram of a PC system. The PC system of FIG. 1 is typical of systems based on the Intel Pentium® and equivalent type processors. A PC CPU 100 is connected by a bus 11 to a north bridge controller 105. Bus 115 typically is a peripheral component interconnect (PCI) bus. The north bridge controller 105 interfaces to a system memory 125. Between the system memory 125 and the north bridge controller 105 is a cache memory 135. The cache memory 135 is used as "temporary" memory, particularly in displaying information to a user. From the north bridge controller 105 is a south bridge controller 110 used to interface to peripheral or input output (IO) devices. A bus 120 connects the north bridge controller 105 to the south bridge controller 110. The bus 120 is also typically a PCI bus. From the south bridge controller a bus 130 connects peripheral or IO devices. Bus 130 can be a PCI bus.

Figure 2:
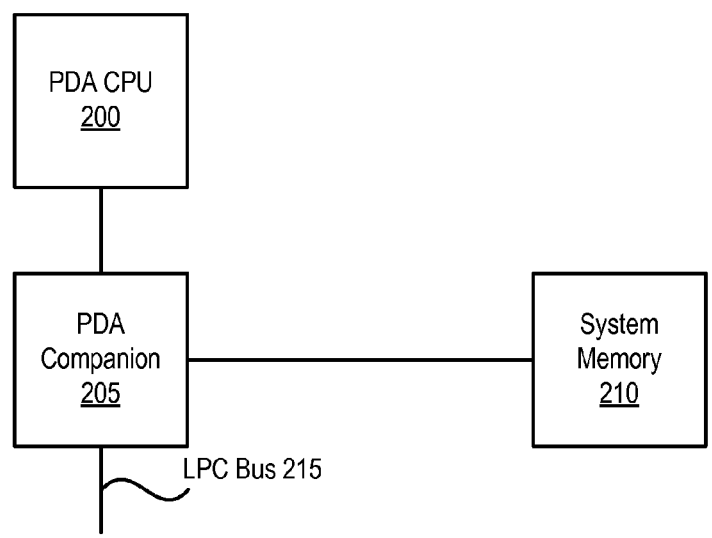
FIG. 2 illustrates a block diagram of a personal digital assistant (PDA) system.

Now referring to FIG. 2 illustrated is a block diagram of a PDA system. In a PDA system a PDA CPU 200 interfaces to a companion processor 205. The companion processor 120 handles interfacing to peripherals and to a system memory 210. From the companion processor 205 is a bus 215. Bus 215 can be a low pin count (LPC) bus and communicate to peripherals and IO devices.

Figure 3:
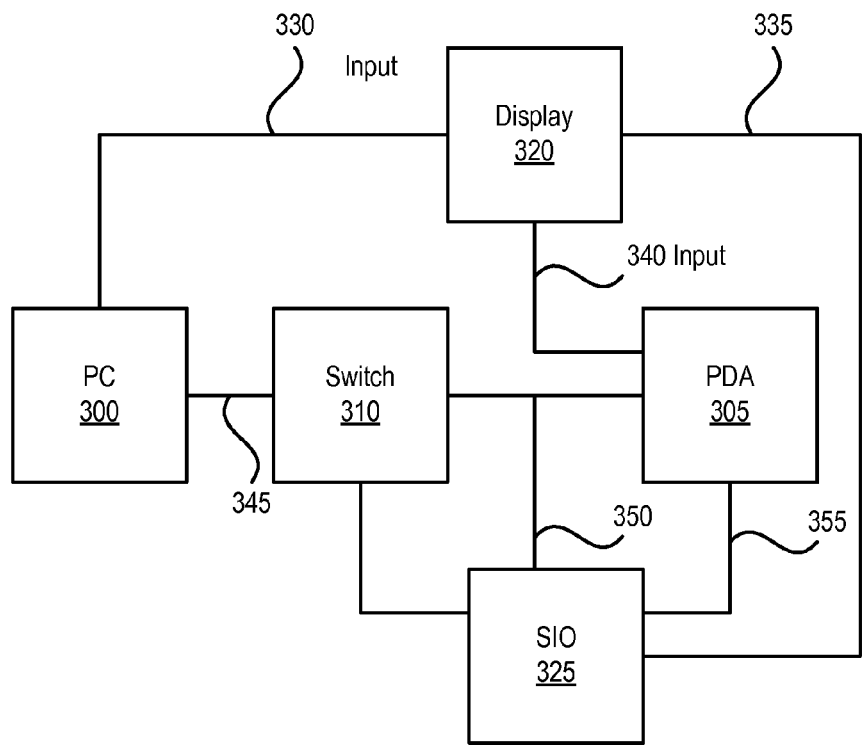
FIG. 3 illustrates a combined PC and PDA computing architecture.

Now referring to FIG. 3 illustrated is a combined PC and PDA computing architecture. A PC system 300 is connected to a switch 310 by a bus 345. The bus 345 can be an LPC bus. The switch 310 is connected to a PDA system 305 by a bus 350. The bus 350 can also be an LPC bus. Either the PC system 300 or the PDA system 305 can have control over the common peripherals and IO devices, including a display 320. The switch 310 isolates either the PC system 300 or the PDA system 305, placing one of the systems in control of the entire computer system. Input and output control is conducted through a serial or super input output controller (SIO) 325. The SIO 325 is connected to the PDA system 305 by the bus 350 and another bus 355. Bus 350 allows the PC system 300 to interface to the SIO 325 and the PDA system 305, with the PC system 300 acting as a "master" device and the PDA system 305 as a "slave." When the PDA system 305 is in control of the computing architecture, the PDA system 305 communicates to the SIO 325 by a bus 355. The bus 355 can be an LPC bus. The SIO 325 provides video control to the display 320 by bus 335 when either the PC system 300 or the PDA system 305 is in control. When in control, the PDA system 305 provides video content by way of bus 340. When the PC system 300 is in control of the computing architecture video content is provided by way of bus 330. Other embodiments of the architecture can include providing a separate and independent connection by way of busses to other common devices from the PC system 300 and the PDA system 305. Common devices can include wireless communication technologies.

Figure 4:
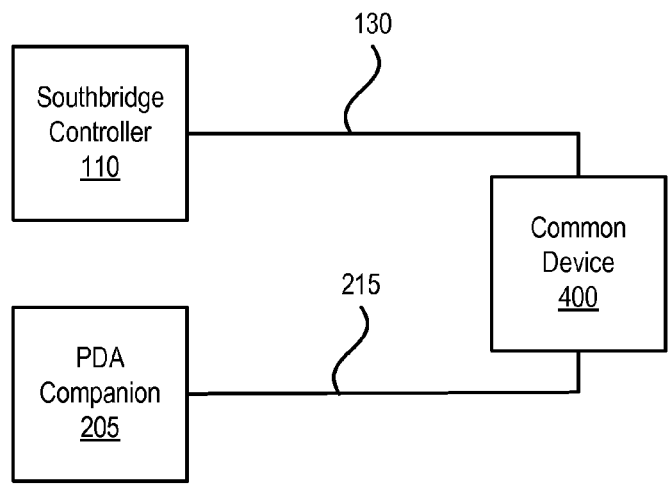
FIG. 4 illustrates a combined PC and PDA computing architecture that provides communication access to either the PC system or the PDA system.

Now referring to FIG. 4, illustrated is a combined PC and PDA computing architecture that provides communication access to either the PC system or the PDA system. In a PC system the south bridge controller can directly connect to a communication device 400 by the PCI bus 130. In a PDA system the companion processor 205 can be connected to the communication device 400 by the LPC bus 215. This computing architecture allows either the PC system or the PDA system to have access to communication, in particular wireless technology. Access by either the PC system or the PDA system is possible, regardless of the active status of either system. Therefore if the PDA system is off, the PC system is able to receive messages such as email. If the PC system is off, the PDA system is able to receive messages.

Referring back to FIG. 3, the PC system 300 and the PDA system 305 are connected by the bus 345 and the bus 350, and are able to exchange data between their respective memory. Further the connection allows both systems to synchronize messages that are received and eventually archived in the memory of the PC system 300 or the PDA system 305. Considering the limited memory capacity of the PDA system 305, archiving messages would best be undertaken by the PC system 300 with its significantly larger memory.

Figure 5A:
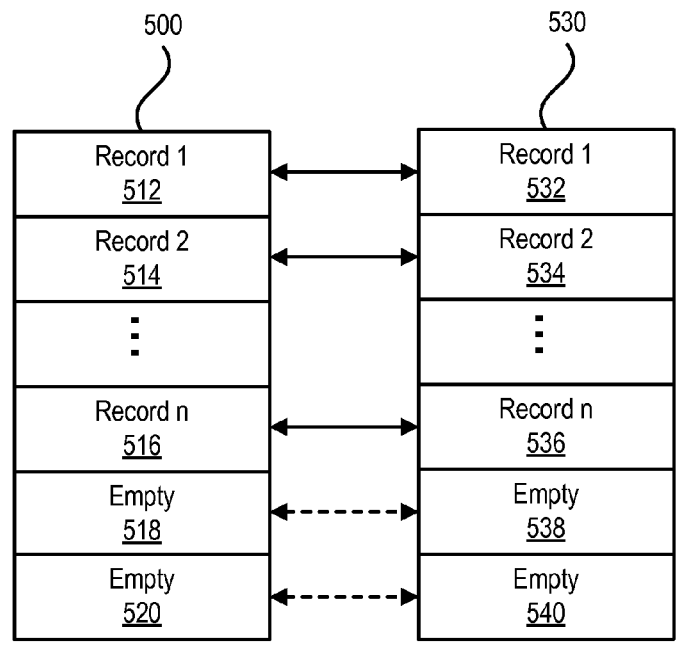
FIG. 5A illustrates a memory array for a PDA system synchronized to a memory array for a PC system.

Now referring to FIG. 5A illustrated is a memory array for a PDA system synchronized to a memory array for a PC system. A PDA memory array 500 has several records for messages such as email or information. A PC memory array 530 has corresponding records to store or refer to messages or information. The records of the memory arrays may be read or unread by a user. The PC memory array 530 may be a separate logical or physical device to the PC system hard drive (permanent storage unit). Therefore in certain embodiments, the PDA memory array 500 is synchronized directly to the PC system hard drive.

The PC system with its large capacity storage has the ability to clear records in its memory array 530 and place messages in its hard drive. Since the PDA memory array 500 and PC memory array 530 are synchronized whenever the PC memory array 530 retrieves messages from the hard drive, the PDA memory array 500 is able to read the messages. In this particular example, "Record 1" 512 of PDA memory array 500 is synchronized to "Record 1" 532 of PC memory array 530. Going down each memory array, "Record 2" 514 is synchronized to "Record 2" 534; "Record N" 516 is synchronized to "Record N" 536; and "Record N+1" 518 is synchronized to "Record N+1" 538. A direct one to one correspondence of each record of the respective memory arrays of the PDA and PC system is made available. In this particular example "Record N+1" 518 of PDA memory array 500 is empty and available to receive a new message, therefore "Record N+1" 538 the corresponding record of PC memory array 530 is also empty. "Record N+P" 520 and "Record N+P" 540 are also empty. In this particular embodiment the records that are empty are not synchronized until a message is received or placed in the corresponding record of the other system's memory array. In this embodiment, the memory array of the respective systems are filled from the first record to the last, in this case the last record is "Record N+P" 520 of PDA memory array 500 and "Record N+P" 540 of PC memory array 530.

Figure 5B:
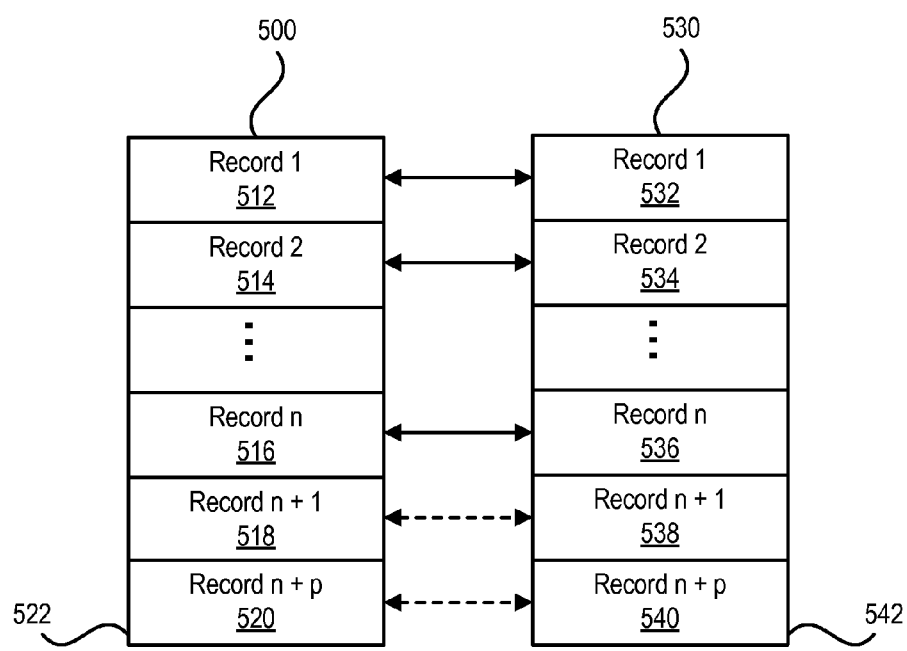
FIG. 5B illustrates filled memory arrays for the PC system and the PDA system.

Now referring to FIG. 5B illustrated are filled memory arrays for the PC system and the PDA system. As messages are received by either system the memory arrays fill up until the end of memory (EOM) of each array is reached. In the case of the PDA memory array 500 the EOM 522 is after "Record N+P" 520, and for the PC memory array 530, the EOM 630 is after "Record N+P" 542.

Figure 5C:
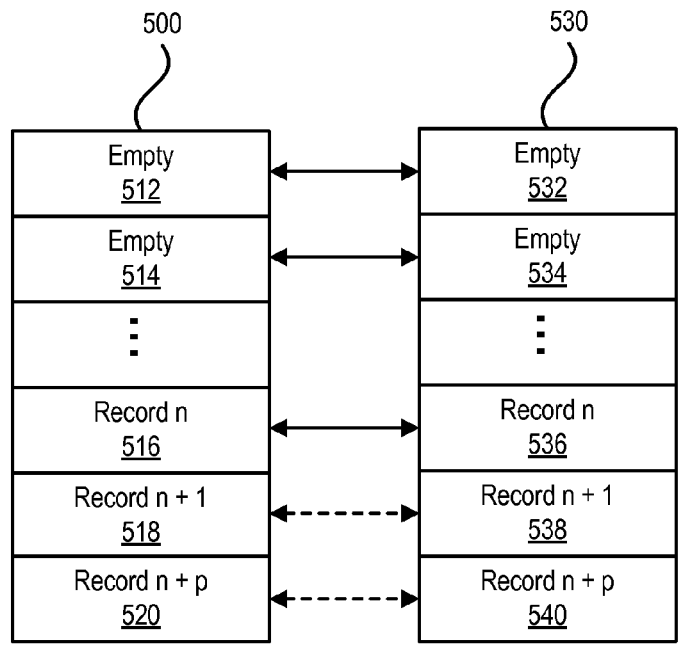
FIG. 5C illustrates cleared and empty records of memory arrays for the PC system and the PDA system.

In order to receive new messages such as email, the record arrays must be cleared. Now referring to FIG. 5C illustrated are cleared and empty records of memory arrays for the PC system and the PDA system. In certain applications, the first records such as "Record 1" 512, "Record 1" 532, "Record 2" 514, and "Record 2" 534 are cleared and emptied to provide for incoming messages. The records are deleted after the old messages that occupied 2 the records are placed in the hard drive of the PC system. With the empty records, new messages may be received by either system then the filled records are synchronized with corresponding records of the memory array of the other system.

When the PC system is active, the computing architecture is able to determine when the memory arrays are completely filled and all records are occupied. The PC system can request that the user archive into the hard disk selected records, delete those selected records from the memory arrays, thus providing empty records in which new messages can be received. An alternative method would be to automatically, without user intervention, archive and delete the oldest records first.

When the PC is inactive, and the PDA is receiving incoming messages, there is a greater concern of running out of records in the PDA memory array 500. A typical scenario is the following. In order to save battery power, the PC system is made inactive or placed into a suspend state. The PC system is not able to receive messages, however, the computer architecture is able to continue receiving messages through the PDA system. Messages come in, take up record space, and without some operator intervention, accumulate, and fill up the PDA memory array 500. New messages cannot be received until messages are deleted and records clear. A predetermined method to delete old messages to free up records to receive new messages can be arranged. This arrangement however, presents a problem when a user has not read all of the messages and older unread messages are deleted without the user saving or having the opportunity to read the message.

Figure 5D:
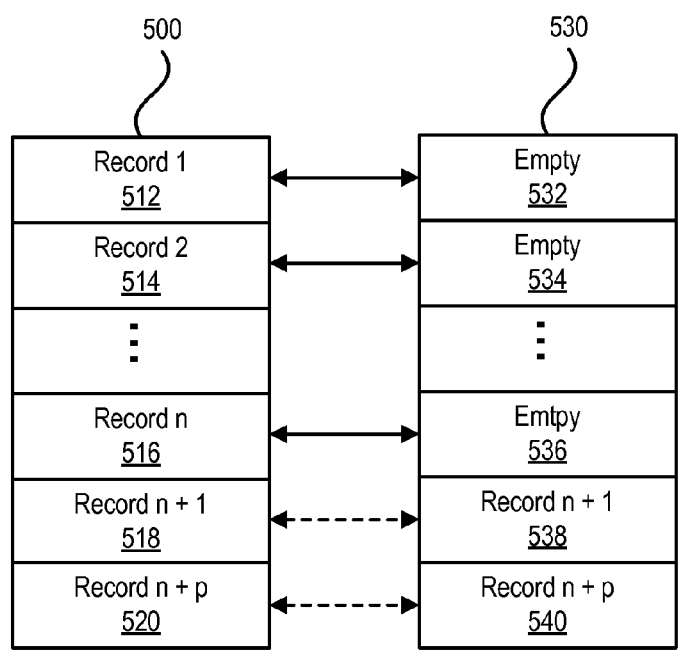
FIG. 5D illustrates a PDA memory array and a PC memory with synchronized and non-synchronized records.

Now referring to FIG. 5D illustrated are a PDA memory array and a PC memory with synchronized and non-synchronized records. When the PC system is inactive, the PDA system continues to receive messages and its records are filled with the messages. Since the PC system is inactive, the records of PC memory array 530 that correspond to records of PDA memory array 500 that are filled with new messages are not synchronized. "Record 1" 512 of PDA memory array 500 is not synchronized to "Record 1" 532 of PC memory array 20 530. Therefore "Record 1" 532 is "empty" and contains no message (information). As new messages are received by the PDA system, while the PC is inactive the records fill up, however, only the records in PDA memory array 500 are filled. Illustrated is a filled PDA memory array 500. "Record 1" 512, "Record 2" 514, and all records up to and including "Record N" are filled records in PDA memory array 500. These new messages contained in PDA memory array 500, however, are not synchronized with their corresponding records in PC memory array 530 which are "Record 1" 532, "Record 2" 534 up to and including "Record N" 536. In this particular example, "Record N+1" 518 of PDA memory array 500 is synchronized to "Record N+1" 538 of PC memory array 530. And all records up to and including "Record N+P" 520 of PDA memory array 500 are synchronized with "Record 30 N+P" 540 of PC memory array 530.

Figure 5E:
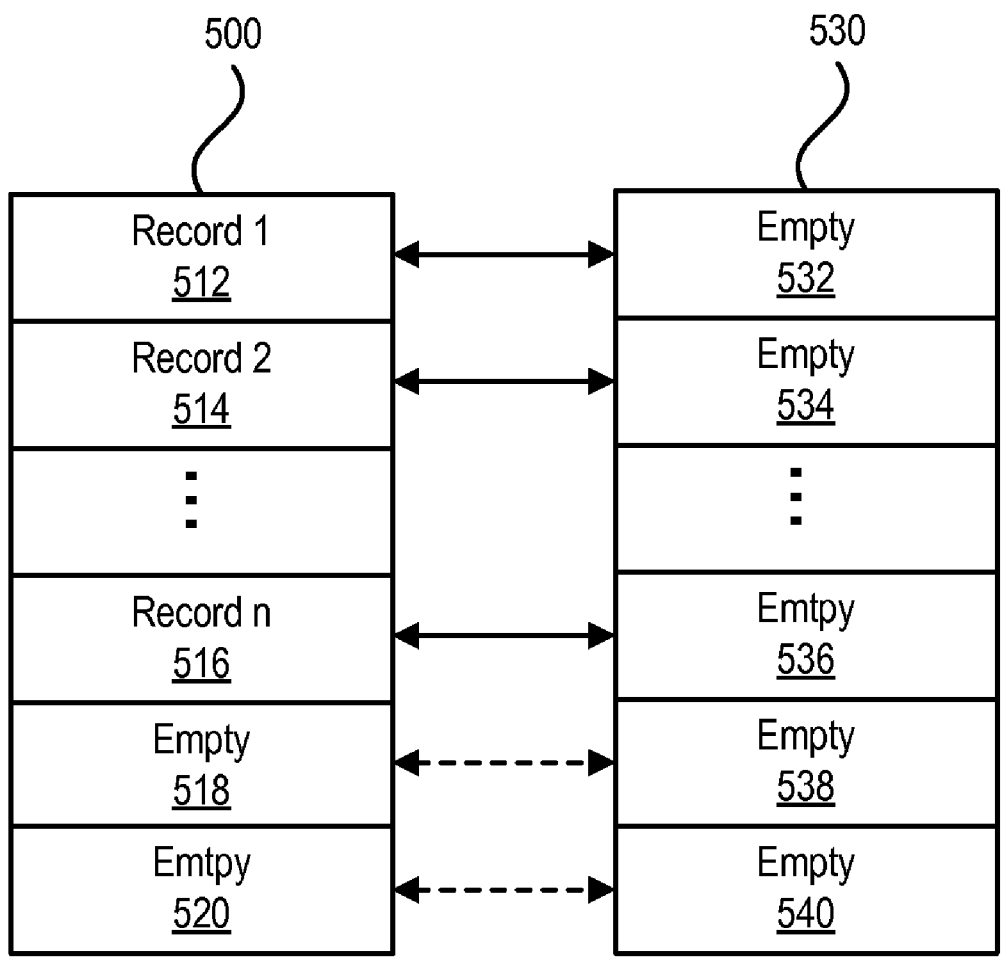
FIG. 5E illustrates a PDA memory array 500 with free space and an empty PC memory array 530.

Since the PC memory array 500 can archive old messages into hard drive memory, the older synchronized files can be archived and the records deleted, thus freeing up space for new messages. Now referring to FIG. 5E illustrated is PDA memory array 500 with free space and an empty PC memory array 530. After archiving the messages of the synchronized records, in this particular example, "Record N+1" 538 up to and including "Record N+P" 540 of PC memory array 500, the records "Record N+1" 518 up to and including "Record N+P" 520 of PDA memory array 500 are deleted, freeing up these records in order to receive new messages. The user can be made aware that messages have been deleted from the PDA system, and that they may be retrieved since they have been archived in the PC system. This archiving and deletion process takes place until all the records of the PDA memory array 500 are filled. This process occurs while the PC system is inactive or suspended. When the PC system is activated, synchronization of the records can take place. As the PDA system remains active and receiving messages, and the PC system remains inactive, the PDA memory array 530 fills up with non-synchronized messages. When the EOM 522 of PDA memory array 530 is reached, the PDA system can either look to a predetermined preference to delete records and provide space for incoming messages or the PDA system can alert the user that the PDA memory array 500 is filled and request action from the user. In order to avoid having the user manually look at, read, and select records to delete from the PDA memory array 500, the following can take place. The PDA system can activate or wake up from a suspend state the PC system when PDA memory array 500 is full. As the PC system is awoken, records from the PDA memory array 500 are synchronized to the PC memory array 530. As files are synchronized, records from the PDA memory array 500 are erased and the space made available for new messages. Alternatively, the PDA system can stop receiving messages and allow the user to read the messages, and delete the messages from the records after they have been read.

Variations of the synchronization process can include providing alerts to the user as to messages that are being deleted from the memory arrays. The user can also be informed of actions that are needed to be taken such as reading messages or manually activating the PC system. A provision can be made for the PDA memory array 500 to contain headers for the records contained therein. The headers of the individual records are used to identify that messages have been purged and archived to the PC system memory. The user also is made aware that the messages can be retrieved from the PC system memory. Embodiments of the invention can include provision for the user to set preferences as to messages that may be received and stored in the PDA memory array 500 without purging. Also the preference can include automatically purging certain messages. A flag may be set for incoming messages which identifies them as important messages that require the user's attention. Alternatively, "junk e-mail" or other unwanted messages without a special flag, messages that would take up valuable record space in the PDA memory array, may be automatically purged and sent or not sent to the PC system memory.

Although the present invention has been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A mobile computing system comprising:
   a common communication device, the common communication device comprising a switch and a super input output (SIO) controller;
   a personal computing system (PC) coupled to the switch of the common communication device, the PC including a storage device capable of receiving and storing messages from the communication device;
   a mobile computing device coupled to the switch and the SIO controller of the common communication device, the mobile computing device including a storage device capable receiving and storing messages from the communication device, whereby the storage device of the PC is capable of synchronizing messages received from the common communication device with the storage device of the mobile computing device , and wherein
   the PC and the mobile computing device are capable of controlling the common communication device, but one of the PC and the mobile computing device controlling the common communication device at a given time;
   access by either the PC or the mobile computing device to the common communication device is possible regardless of an active status of either the PC or the mobile computing device; and,
   when the PC is active, determining whether to archive selected messages stored on the storage device of the PC to non volatile storage.

2. The mobile computing system of claim 1 wherein the storage device of the PC is a memory array comprised of a set of records, and the storage device of the mobile computing device is a memory array comprised of a set of records.

3. The mobile computing system of claim 2 wherein messages are synchronized between the memory array of the PC and the memory array of the mobile computing device.

4. The mobile computing system of claim 2 wherein a direct correspondence is established between the set of records of the PC memory array and the set of records of the PDA memory array.

5. The mobile computing system of claim 4 wherein messages are synchronized between records of the PC memory array and records of the mobile computing device memory array.

6. The mobile computing system of claim 1 wherein the storage device of the PC is a hard disk drive.

7. The mobile computing system of claim 6 wherein the hard disk drive is comprised of a memory array, and the mobile computing device storage device is comprised of a memory array, wherein the PC hard disk drive memory array corresponds directly to the mobile computing device memory array.

8. A mobile computing system comprising:
   a common communication device, the common communication device comprising a switch and a super input output (SIO) controller;
   a personal computing system (PC) coupled to the switch of the common communication device, the PC capable of receiving messages through the common communication device;
   a mobile computing device coupled to the switch and the SIO controller of the common communication device, the mobile computing device capable of receiving messages through the common communication device and synchronizing the messages received through the common communication device with the PC, and wherein
   the PC and the mobile computing device are capable of controlling the common communication device, but one of the PC and the mobile computing device controlling the common communication device at a given time;
   access by either the PC or the mobile computing device to the common communication device is possible regardless of an active status of either the PC or the mobile computing device; and,
   when the PC is active, determining whether to archive selected messages stored on the storage device of the PC to non volatile storage.

9. The mobile computing system of claim 8 wherein the mobile computing device is further comprised of a memory array where messages are received and entered, and the memory array is synchronized to the PC.

10. The mobile computing system of claim 9 wherein the PC is further comprised of a memory array that is synchronized to the memory array of the mobile computing device.

11. The mobile computing system of claim 9 wherein the PC is further comprised of a hard disk drive that is synchronized to the memory array of the mobile computing device.

12. A method of clearing and archiving messages in a dual system computer architecture, the dual system computer architecture including a mobile computing device coupled to a common communication device and a second computer system coupled to the common communication device, the common communication device comprising a switch and a super input output (SIO) controller, the mobile computing device and the second computer system being capable of controlling the common communication device with one of the mobile computing device and the second computer system controlling the common communication device at a given time, access by either the mobile computing device or the second computer system to the common communication device is possible regardless of an active status of either the mobile computing device or the second computer system, the method comprising:
   receiving and storing messages by the mobile computing device to a first memory device;
   synchronizing the messages with the second computer system, whereby the second computer system archives synchronized messages to a second memory device; and
   deleting synchronized and archived messages whenever the first memory device is filled.

13. The method of clearing and archiving messages in a dual system computer architecture of claim 12 further comprising:
   identifying the deleted messages in the first memory devices.

14. The method of clearing and archiving messages in a dual system computer architecture of claim 13 further comprised of:
   setting preferences as to received and stored messages.

15. The method of clearing and archiving messages in a dual system computer architecture of claim 14 further comprised of:
   setting preferences as to received and stored messages.

16. The method of clearing and archiving messages in a dual system computer architecture of claim 13 wherein the mobile computing device is a personal digital assistant system (PDA) and the second computer system is a personal computer system (PC).

17. The method of clearing and archiving messages in a dual system computer architecture of claim 16 further comprised of:
   setting preferences as to received and stored messages.

18. The method of clearing and archiving messages in a dual system computer architecture of claim 12 wherein the mobile computing device is a personal digital assistant system (PDA) and the second computer system is a personal computer system (PC).

19. The method of clearing and archiving messages in a dual system computer architecture of claim 18 further comprised of:
   deleting messages from the first memory device after the messages have been read by the user.

20. The method of clearing and archiving messages in a dual system computer architecture of claim 19 wherein the mobile computing device is a personal digital assistant (PDA) and the second computer system is a personal computer system (PC).

21. The method of clearing and archiving messages in a dual system computer architecture of claim 19 further comprised of:
   setting preferences as to received and stored messages.

22. The method of clearing and archiving messages in a dual system computer architecture of claim 18 further comprised of:
   setting preferences as to received and stored messages.

23. The method of clearing and archiving messages in a dual system computer architecture of claim 22 further comprised of:
   setting preferences as to received and stored messages.

24. The method of clearing and archiving messages in a dual system computer architecture of claim 12 further comprised of:
   setting preferences as to received and stored messages.

25. A method of clearing and archiving messages in a dual system computer architecture, the dual system computer architecture including a mobile computing device coupled to a common communication device and a second computer system coupled to the common communication device, the common communication device comprising a switch and a super input output (SIO) controller, the mobile computing device and the second computer system being capable of controlling the common communication device with one of the mobile computing device and the second computer system controlling the common communication device at a given time, access by either the mobile computing device or the second computer system to the common communication device is possible regardless of an active status of either the mobile computing device or the second computer system, the method comprising:
   receiving and storing messages by the mobile computing device to a first memory device;
   synchronizing the messages with the second computer system, whereby the second computer system archives synchronized messages to a second memory device; and
   informing a user whenever the first memory device is filled.

26. The method of clearing and archiving messages in a dual system computer architecture of claim 25 wherein the mobile computing device is a personal digital assistant (PDA) and the second computer system is a personal computer system (PC).

27. The method of clearing and archiving messages in a dual system computer architecture of claim 25 further comprised of:
   setting preferences as to received and stored messages.

* * * * *